United States Patent
Fischer et al.

(10) Patent No.: US 12,036,988 B2
(45) Date of Patent: Jul. 16, 2024

(54) METHOD AND CONTROL UNIT FOR OPERATING AN ADAPTIVE CRUISE CONTROLLER

(71) Applicant: Bayerische Motoren Werke Aktiengesellschaft, Munich (DE)

(72) Inventors: Matthias Fischer, Rohrbach (DE); Walter Kagerer, Munich (DE); Patrick Sauermann, Augsburg (DE); Thomas Velten, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 460 days.

(21) Appl. No.: 17/420,461

(22) PCT Filed: Dec. 18, 2019

(86) PCT No.: PCT/EP2019/085916
§ 371 (c)(1),
(2) Date: Jul. 2, 2021

(87) PCT Pub. No.: WO2020/151885
PCT Pub. Date: Jul. 30, 2020

(65) Prior Publication Data
US 2022/0080969 A1     Mar. 17, 2022

(30) Foreign Application Priority Data
Jan. 23, 2019  (DE) .................... 10 2019 101 662.2

(51) Int. Cl.
*B60W 30/16*   (2020.01)
*B60W 30/14*   (2006.01)
(Continued)

(52) U.S. Cl.
CPC ........ *B60W 30/162* (2013.01); *B60W 30/146* (2013.01); *B60W 30/18163* (2013.01);
(Continued)

(58) Field of Classification Search
None
See application file for complete search history.

(56) References Cited

U.S. PATENT DOCUMENTS 5,999,874 A * 12/1999 Winner ................. B60W 30/16
701/96
6,116,369 A 9/2000 King et al.
(Continued)

FOREIGN PATENT DOCUMENTS

| CA | 3 033 164 A1 | 2/2018 |
| CN | 102126497 A | 7/2011 |

(Continued)

OTHER PUBLICATIONS

International Search Report (PCT/ISA/210) issued in PCT Application No. PCT/EP2019/085916 dated May 15, 2019 with English translation (four (4) pages).
(Continued)

*Primary Examiner* — Peter D Nolan
*Assistant Examiner* — Jacob Kent Besteman-Street
(74) *Attorney, Agent, or Firm* — Crowell & Moring LLP

(57) ABSTRACT

A control unit for a vehicle is configured to determine, during an approaching manoeuvre of a distance controller and/or cruise controller of the vehicle towards a vehicle in front, whether or not the vehicle will overtake or can overtake the vehicle in front during the approaching manoeuvre. Furthermore, during the approaching manoeuvre, the control unit is configured to adjust a behaviour of the cruise controller and/or adaptive cruise controller of the vehicle on the basis of the above determination.

11 Claims, 2 Drawing Sheets

(51) Int. Cl.
*B60W 30/18* (2012.01)
*B60W 40/08* (2012.01)
*B60W 40/105* (2012.01)
*B60W 50/00* (2006.01)
*B60W 50/10* (2012.01)

(52) U.S. Cl.
CPC .......... *B60W 40/08* (2013.01); *B60W 40/105* (2013.01); *B60W 50/0097* (2013.01); *B60W 50/10* (2013.01); *B60W 2050/0022* (2013.01); *B60W 2540/225* (2020.02); *B60W 2554/802* (2020.02); *B60W 2556/40* (2020.02); *B60W 2720/10* (2013.01)

(56) References Cited

U.S. PATENT DOCUMENTS

| | | | | |
|---|---|---|---|---|
| 2003/0163239 | A1* | 8/2003 | Winner | B60K 31/0008 701/93 |
| 2009/0276135 | A1* | 11/2009 | Hagemann | B60W 30/16 701/96 |
| 2011/0196592 | A1 | 8/2011 | Kashi et al. | |
| 2014/0156164 | A1* | 6/2014 | Schuberth | B60K 31/00 701/96 |
| 2015/0353087 | A1* | 12/2015 | Niino | B60W 30/16 701/96 |
| 2017/0329340 | A1* | 11/2017 | Ulbrich | B60K 31/0008 |
| 2018/0154894 | A1* | 6/2018 | Norwood | B60W 30/09 |
| 2018/0178796 | A1 | 6/2018 | Fukuda et al. | |
| 2019/0256104 | A1* | 8/2019 | Shimizu | B60W 30/182 |
| 2021/0139047 | A1* | 5/2021 | Geldner | B60W 50/16 |
| 2021/0221379 | A1* | 7/2021 | Sato | F16H 61/0213 |
| 2021/0380117 | A1* | 12/2021 | Gonzalez | B60W 30/12 |

FOREIGN PATENT DOCUMENTS

| | | |
|---|---|---|
| CN | 108162963 A | 6/2018 |
| DE | 196 37 245 A1 | 3/1998 |
| DE | 197 19 476 A1 | 11/1998 |
| DE | 698 26 078 T2 | 1/2005 |
| DE | 10 2005 007 800 A1 | 8/2006 |
| DE | 10 2006 043 149 A1 | 3/2008 |
| DE | 10 2010 004 625 A1 | 7/2011 |
| DE | 10 2010 041 620 A1 | 3/2012 |
| DE | 10 2015 210 194 A1 | 12/2015 |
| DE | 10 2016 208 000 A1 | 11/2017 |
| FR | 2 770 016 A1 | 4/1999 |

OTHER PUBLICATIONS

German-language Written Opinion (PCT/ISA/237) issued in PCT Application No. PCT/EP2019/085916 dated May 15, 2019 (six (6) pages).

German-language Search Report issued in German Application No. 1 2019 101 662.2 dated Jul. 25, 2019 with partial English translation (14 pages).

Chinese-language Office Action issued in Chinese Application No. 201980089831.1 dated Apr. 27, 2023 with English translation (15 pages).

* cited by examiner

METHOD AND CONTROL UNIT FOR OPERATING AN ADAPTIVE CRUISE CONTROLLER

BACKGROUND AND SUMMARY OF THE INVENTION

The invention relates to a method and a corresponding control unit for operating an adaptive cruise controller, in particular an ACC (adaptive cruise control) system, of a vehicle.

A vehicle may comprise an adaptive cruise controller, in particular an ACC system, with which the vehicle can be automatically guided along at a specific desired distance from a vehicle in front. Already while the vehicle is approaching the vehicle in front, i.e. already during an approaching procedure, the cruise controller may automatically set the driving speed of the vehicle in order to position the vehicle at a desired distance behind the vehicle in front. The driving speed of the vehicle may then be automatically and repeatedly adapted to the driving speed of the vehicle in front in order to guide the vehicle behind the vehicle in front at the desired distance.

The present document is concerned with the technical object of increasing the convenience for a user of a cruise controller of a vehicle in an approaching procedure with respect to a vehicle in front.

The object is achieved by the claimed invention.

According to one aspect, a control unit for a vehicle, in particular for a motor vehicle, is described. The control unit is configured to predict or determine during an approaching procedure of a cruise controller of the vehicle with respect to a vehicle in front whether or not the vehicle will (possibly and/or probably) overtake the vehicle in front during the approaching procedure. In particular, it can be predicted or determined whether the vehicle can or cannot overtake the vehicle in front during the approaching procedure. If it is determined that the vehicle cannot overtake the vehicle in front during the approaching procedure, it can be concluded or predicted from this that the vehicle also will not overtake the vehicle in front during the approaching procedure. On the other hand, it can be predicted that the vehicle will (probably and/or possibly) overtake the vehicle in front during the approaching procedure if it is determined that the vehicle can (in principle) overtake the vehicle in front during the approaching procedure. For example, it can be detected on the basis of environment data and/or map data that there is a free overtaking lane for overtaking the vehicle in front, and that consequently an overtaking procedure would be possible in principle.

The control unit may be configured to operate the vehicle during the operation of the cruise controller in such a way that, after completion of the approaching procedure, the vehicle is at least on average over time at a desired distance from the vehicle in front. Alternatively or additionally, the control unit may be configured to operate the vehicle during the operation of the cruise controller in such a way that, after completion of the approaching procedure, the vehicle has at least on average over time the driving speed of the vehicle in front.

On the other hand, during the approaching procedure, the vehicle is typically at a greater distance from the vehicle in front than the desired distance and/or is driving at a greater speed than the driving speed of the vehicle in front. The control unit may be configured to operate the vehicle during the approaching procedure of the cruise controller (in particular guide it along in an automated manner) in such a way that the distance from the vehicle in front is reduced to the desired distance and/or that the driving speed of the vehicle is reduced to the driving speed of the vehicle in front.

The control unit may be configured to ascertain environment data from one or more environment sensors of the vehicle. Exemplary environment sensors are an image camera, a lidar sensor, a radar sensor, an ultrasound sensor, etc. Alternatively or additionally, the control unit may be configured to ascertain map data with respect to a roadway on which the vehicle is driving. The map data may for example indicate the number of lanes of the roadway and/or the traveling directions of the individual lanes. Furthermore, the control unit may be configured to ascertain position data (for example GPS coordinates) with respect to a current position of the vehicle.

Furthermore, the control unit may be configured to predict on the basis of the environment data, the map data, and/or the position data whether or not the vehicle will overtake the vehicle in front during the approaching procedure. In particular, it can be predicted on the basis of the environment data, the map data, and/or the position data whether or not the vehicle can overtake the vehicle in front during the approaching procedure. For example, it can be ascertained on the basis of the environment data, the map data and/or the position data whether an overtaking lane is available and free for the vehicle for overtaking the vehicle in front. If it is ascertained that an overtaking lane is available and free, it can possibly be concluded from this that an overtaking procedure will take place or can take place. On the other hand, it can be predicted or determined that no overtaking procedure will take place or can take place if it is ascertained that no overtaking lane is available and/or that an available overtaking lane is not free. Thus, it can be reliably predicted whether or not the vehicle will overtake the vehicle in front during the approaching procedure.

Alternatively or additionally, the control unit may be configured to ascertain driver data with respect to the driver, in particular with respect to a behavior of the driver, of the vehicle. The driver data may be ascertained for example by way of a camera that is directed at the driver of the vehicle. The driver data may for example indicate a viewing direction of the driver. It can then be predicted on the basis of the driver data whether or not the vehicle will overtake the vehicle in front during the approaching procedure. For example, it can be determined on the basis of the driver data that, although an overtaking procedure of the vehicle in front would be possible, no overtaking procedure will take place, since the behavior of the driver (for example the viewing direction) suggests that the driver will not initiate an overtaking procedure. Consequently, the prediction of an overtaking procedure can be further improved by taking driver data into account.

The control unit is also configured to set the behavior of the cruise controller (in particular the ACC system) of the vehicle during the approaching procedure according to whether it has been predicted or determined that an overtaking procedure will take place, or that no overtaking procedure will take place. Alternatively or additionally, the control unit may be configured to set the behavior of the cruise controller (in particular the ACC system) of the vehicle during the approaching procedure according to whether it has been predicted or determined that an overtaking procedure can take place, or that no overtaking procedure can take place. Thus, the convenience for a user of a vehicle can be increased.

The behavior of the cruise controller may be set in such a way that the driving speed of the vehicle during the approaching procedure is reduced relatively late, and/or at a relatively late point in time with a relatively great deceleration, if it has been predicted or determined that the vehicle will overtake (or can overtake) the vehicle in front during the approaching procedure. It can thus be brought about that the vehicle remains prepared for carrying out the overtaking procedure for as long as possible during the approaching procedure. Thus, the convenience for a driver of the vehicle for carrying out an overtaking procedure can be increased.

On the other hand, the behavior of the cruise controller may be set in such a way that the driving speed of the vehicle during the approaching procedure is reduced relatively early, and in this case with a relatively small deceleration, if it has been predicted or determined that the vehicle will not overtake (or cannot overtake) the vehicle in front during the approaching procedure. Thus, the convenience for the driver of the vehicle in an approaching procedure without an intention to overtake can be increased.

For example, the behavior of the cruise controller may be set in a standard mode in such a way that the driving speed of the vehicle during the approaching procedure is reduced at a reference point in time with a reference deceleration. The standard mode may for example take place when there is no information available as to whether the vehicle will overtake (or can overtake) the vehicle in front during the approaching procedure.

The driving speed of the vehicle during the approaching procedure may be reduced relatively late and/or at a relatively late point in time (in comparison with the reference point in time) with a relatively great deceleration (in comparison with the reference deceleration) if it has been predicted or determined that the vehicle will overtake (or can overtake) the vehicle in front during the approaching procedure. Alternatively or additionally, the driving speed of the vehicle during the approaching procedure may be reduced relatively early and/or at a relatively early point in time (in comparison with the reference point in time) with a relatively low deceleration (in comparison with the reference deceleration) if it has been predicted or determined that the vehicle will not overtake (or cannot overtake) the vehicle in front during the approaching procedure.

The driving speed of the vehicle during the approaching procedure may be reduced for example as from a first point in time with a first deceleration if it has been predicted or determined that the vehicle will overtake (or can overtake) the vehicle in front during the approaching procedure. On the other hand, the driving speed of the vehicle during the approaching procedure may be reduced as from a second point in time with a second deceleration if it has been predicted or determined that the vehicle will not overtake (or cannot overtake) the vehicle in front during the approaching procedure. The first point in time may be at a later time than the second point in time. Furthermore, the first deceleration may be greater than the second deceleration.

The control unit may be configured to adapt the driving speed of the vehicle during the approaching procedure repeatedly, in particular periodically (for example with a frequency of 1 Hz or more), according to a value of an error measure, in particular a control error. In particular, the cruise controller may be designed to (repeatedly) reduce the value of the error measure. The error measure may in this case be dependent on the weighted sum of the deviation of the actual distance of the vehicle from the vehicle in front in relation to the desired distance and from the actual relative speed of the vehicle in relation to the vehicle in front. The error measure can consequently weight the distance deviation and the speed deviation (i.e. the actual relative speed) and take it into account as a weighted sum.

The weighting of the distance deviation in relation to the weighting of the speed deviation may be dependent on whether it has been predicted or determined that the vehicle will (or can) overtake the vehicle in front during the approaching procedure, or that the vehicle will not overtake (or cannot overtake) the vehicle in front during the approaching procedure. In particular, the weighting may be set relatively high with respect to the actual relative speed of the vehicle and/or be increased (in relation to the weighting of the distance deviation) if it has been predicted or determined that the vehicle will not overtake (or cannot overtake) the vehicle in front during the approaching procedure. On the other hand, the weighting may be set relatively low with respect to the actual relative speed of the vehicle and/or be reduced (in relation to the weighting of the distance deviation) if it has been predicted or determined that the vehicle will overtake (or can overtake) the vehicle in front during the approaching procedure. Thus, the behavior of the cruise controller can be adapted or set in a particularly reliable way.

In other words, the weighting with respect to the actual relative speed of the vehicle may be increased in comparison with the weighting of the distance deviation if it has been predicted or determined that the vehicle will not overtake (or cannot overtake) the vehicle in front during the approaching procedure. On the other hand, the weighting with respect to the actual relative speed of the vehicle may be reduced in comparison with the weighting of the distance deviation if it has been predicted or determined that the vehicle will overtake (or can overtake) the vehicle in front during the approaching procedure.

According to a further aspect, a method for operating a cruise controller of a vehicle is described. The method comprises predicting during an approaching procedure of the cruise controller of the vehicle with respect to a vehicle in front whether the vehicle will or will not overtake (or can or cannot overtake) the vehicle in front during the approaching procedure. Furthermore, the method comprises setting the behavior of the cruise controller of the vehicle during the approaching procedure according to whether it has been predicted that the vehicle will overtake (or can overtake) the vehicle in front during the approaching procedure, or that the vehicle will not overtake (or cannot overtake) the vehicle in front during the approaching procedure.

According to a further aspect, a (road) motor vehicle (in particular a passenger car or a truck or a bus or a motorcycle) which comprises the control unit described in this document is described.

According to a further aspect, a software program is described. The software may be configured to be run on a processor (for example on a control device of a vehicle), and thereby to perform the method described in this document.

According to a further aspect, a storage medium is described. The storage medium may comprise a software program which is configured to be run on a processor, and thereby to perform the method described in this document.

It should be noted that the methods, devices and systems described in this document can be used both alone and in combination with other methods, devices and systems described in this document. Furthermore, any aspects of the methods, devices and systems described in this document can be combined with one another in various ways. In particular, the features of the claims can be combined with one another in various ways.

The invention is described in more detail below on the basis of exemplary embodiments.

DETAILED DESCRIPTION OF THE DRAWINGS

As explained at the beginning, the present document is concerned with the convenient operation of a cruise controller, in particular an ACC system, of a vehicle. In this case it is intended in particular to increase the convenience during the procedure of the vehicle approaching a vehicle in front.

Figure 1:
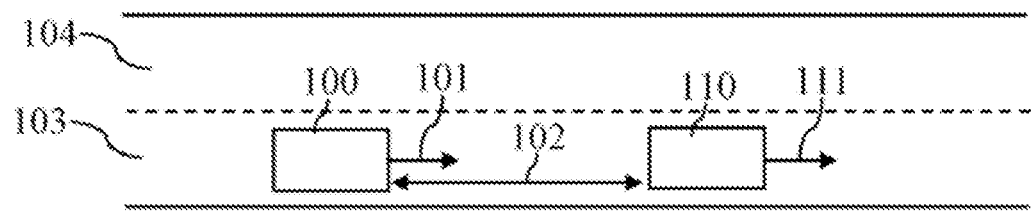
FIG. 1 shows a driving situation, given by way of example.

FIG. 1 shows a vehicle 100, given by way of example (also referred to in this document as the ego vehicle), which is driving behind a vehicle in front 110, in a lane 103. The ego vehicle 100 has an ego driving speed 101, and the vehicle in front 110 has a driving-in-front speed 111. The ego vehicle 100 is at an actual distance 102 behind the vehicle in front 110.

Figure 2:
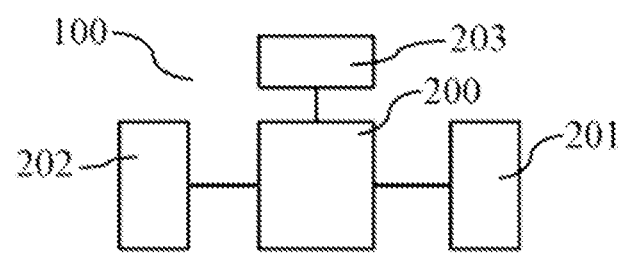
FIG. 2 shows components, given by way of example, of a vehicle.

FIG. 2 shows components, given by way of example, of a vehicle 100. The vehicle 100 comprises one or more environment sensors 201, which are configured to record environment data (i.e. sensor data) with respect to the environment of the vehicle 100. Exemplary environment sensors 201 are an image camera, a lidar sensor, a radar sensor, an ultrasound sensor, etc. A control unit 200 of the vehicle 100 is configured to ascertain on the basis of the environment data the actual distance 102 of the vehicle 100 from the vehicle in front 110. Furthermore, on the basis of the environment data, the relative speed between the vehicle in front 110 and the vehicle 100 (i.e. the difference taken from the driving-in-front speed 111 and the ego driving speed 101) can be ascertained.

The control unit 200 may also be configured to operate one or more longitudinal guidance actuators 202 (in particular a drive motor and/or a brake) of the vehicle 100 according to the environment data. In particular, the one or more longitudinal guidance actuators 202 for providing a cruise controller may be operated in such a way that the ego vehicle 100 is at a desired distance (which possibly can be set) behind the vehicle in front 110, and in this case has (at least on average over time) the driving speed 111 of the vehicle in front 110.

Furthermore, the control unit 200 may be configured to operate the one or more longitudinal guidance actuators 202 in an automated manner during an approach phase of the ego vehicle 100 with respect to the vehicle in front 110, it being intended that during the approach phase the effect is brought about that the actual distance 102 of the ego vehicle 100 is reduced to the desired distance, and that the driving speed 101 of the ego vehicle 100 is reduced to the driving speed 111 of the vehicle in front 110. The variations over time of the actual distance 102 and the driving speed 101 of the ego vehicle 100 during an approach phase can in this case be set or adapted.

Figure 3A:
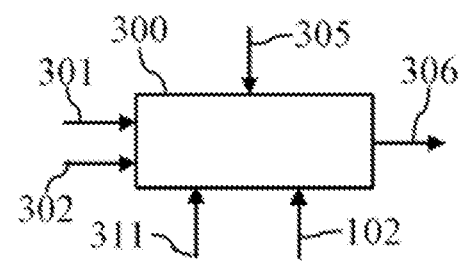
FIG. 3a shows a unit, given by way of example, for ascertaining an error measure, in particular a control error, of a cruise controller.

The control unit 200 may be configured to operate the one or more actuators 202 of the vehicle 100 according to an error measure, in particular according to a control error. FIG. 3a shows a unit 300, given by way of example, for ascertaining a value 306 of the error measure. In this case, on the one hand the desired distance 302 from the vehicle in front 110 and a desired relative speed 301 in relation to the driving speed 111 of the vehicle in front 110 may be preset for the ego vehicle 100. The desired relative speed 301 is typically zero.

Furthermore, the actual distance 102 from the vehicle in front 110 and the actual relative speed 311 in relation to the vehicle in front 110 may be ascertained on the basis of the environment data and/or on the basis of sensor data from one or more vehicle sensors (for example from a speed sensor). The differences or deviations between the distances 302, 102 on the one hand and between the relative speeds 301, 311 on the other hand can then be ascertained. The error measure may then comprise a weighted mean value or a weighted sum of the deviation of the distances 302, 102 and the deviation of the relative speeds 301, 311. The one or more weights for forming the weighted sum may be preset as operating parameters 305 for the cruise controller.

The control unit 200 may be configured to operate the one or more longitudinal guidance actuators 202 of the vehicle 100, in particular during an approaching procedure, in such a way that the value 306 of the error measure is reduced. In particular, a control variable for activating the one or more longitudinal guidance actuators 202 may be adapted repeatedly, for example periodically, to reduce the value 306 of the error measure, in particular to reduce the value 306 of the error measure to zero. In this case, weighting the deviation of the distances 302, 102 in relation to the weighting of the deviation of the relative speeds 301, 311 allows the behavior of a cruise controller to be changed, in particular during an approaching procedure.

Figure 3B:
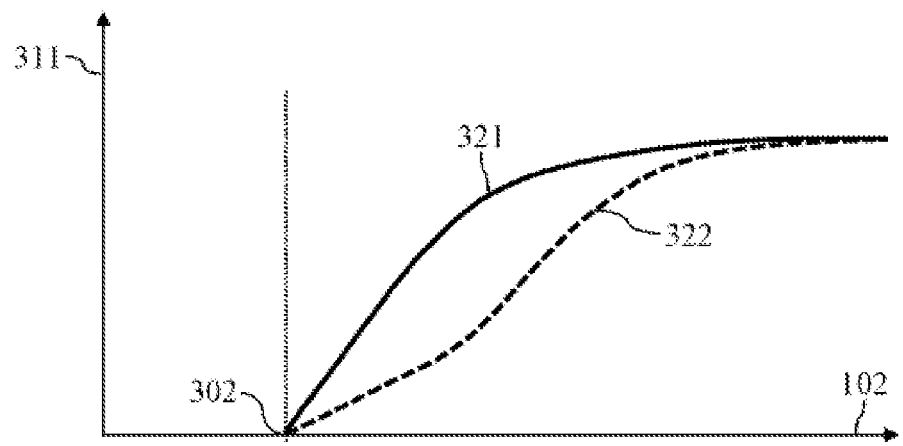
FIG. 3b shows variations in speed/distance, given by way of example, during an approaching procedure of a cruise controller.

FIG. 3b shows a variation 321 over time, given by way of example, of the distance 102 and/or the relative speed 311 during an approaching procedure. In the case of the variation 321, the driving speed 101 of the ego vehicle 100 is kept at a relatively high value for a relatively long time, in order to bring about an approach to the vehicle in front 110 that is as quick as possible. Only shortly before reaching the desired distance 302 are the driving speed 101 of the ego vehicle 100 and consequently the relative speed 311 reduced. This results in a relatively great deceleration of the vehicle 100 at a relatively late point in time of the approach procedure.

Such a variation 321 over time, in which the ego vehicle 100 is braked relatively late and relatively strongly, is advantageous since it gives the driver of the ego vehicle 100 the possibility of initiating an overtaking maneuver during the approaching procedure for overtaking the vehicle in front 110 without being disturbed by automatic braking of the ego vehicle 100. On the other hand, relatively late braking of the ego vehicle 100 may be perceived by the driver of the ego vehicle 100 as unpleasant and unsettling if the driver cannot or does not wish to carry out an overtaking maneuver.

The control unit 200 may be configured to determine or predict during an approaching procedure of the cruise controller of the ego vehicle 100 with respect to a vehicle in front 110 whether or not the driver of the ego vehicle 100 will initiate an overtaking procedure for overtaking the vehicle in front 110. In this connection, it may be ascertained in particular whether there is a possibility for an overtaking procedure at all. For this purpose, the environment data of the one or more environment sensors 201 may be evaluated. Alternatively or additionally, data, in particular map data, of a navigation system 203 of the vehicle 100 may be evaluated. On the basis of these data, it can be ascertained for example whether the ego vehicle 100 is already driving in an overtaking lane;
whether or not an overtaking lane 104 is available for a procedure of overtaking the vehicle in front 110; and/or
whether or not the overtaking lane 104 is occupied by one or more other road users.

It can consequently be ascertained in a precise way whether or not an overtaking maneuver is possible during the approaching procedure. If no overtaking maneuver is possible, it can be concluded from this that the driver does not wish to or will not carry out an overtaking maneuver for overtaking the vehicle in front 110. On the other hand, in the case of a possible overtaking maneuver, it can be predicted or determined that the driver will carry out an overtaking maneuver for overtaking the vehicle in front 110.

Alternatively or additionally, sensor data with respect to the driver of the ego vehicle 100, i.e. driver data, may be detected and evaluated in order to determine whether the driver would like to carry out or will carry out an overtaking maneuver. For example, the viewing direction of the driver may be analyzed in order to ascertain the intention of the driver.

The behavior of the cruise controller of the vehicle 100 may then be set or adapted, in particular during the approaching procedure, according to whether it has been determined that the driver of the ego vehicle 100 will overtake the vehicle in front 110, or whether it has been determined that the driver of the ego vehicle 100 will not overtake the vehicle in front 110. In this case, in particular at least one operating parameter 305 of the cruise controller may be set or adapted. For example, the weighting of the deviation of the relative speeds 301, 311, in relation to the weighting of the deviation of the distances 302, 102 may be increased if it has been determined that the driver of the ego vehicle 100 will not overtake the vehicle in front 110, in order to bring about the effect that the driving speed 101 of the ego vehicle 100 is already reduced at a relatively early time during the approaching procedure. Thus, the convenience for the driver of the ego vehicle 100 during an approaching procedure can be increased.

FIG. 3b shows a variation 321, given by way of example, of the relative speed 311 in an approaching procedure, for the case where it has been determined that the driver of the ego vehicle 100 will overtake the vehicle in front 110. Furthermore, FIG. 3b shows a variation 322, given by way of example, of the relative speed 311 in an approaching procedure for the case where it has been determined that the driver of the ego vehicle 100 will not overtake the vehicle in front 110.

It can consequently be determined during the operation of an ACC system whether an adjacent lane 104 (for example on the left) that can be driven in the traveling direction of the ego vehicle is present alongside the ego lane 103. For this purpose, data from the navigation system 203 may be compared with camera data and/or data on obstacles of the radar sensor system. It can thus be determined whether an adjacent lane 104 is present. Furthermore, it is determined by way of the radar sensor system whether, and if so which, vehicles are driving in the adjacent lane 104. It can consequently be determined whether the adjacent lane 104 is a lane for oncoming traffic or a lane in the traveling direction of the ego vehicle. Furthermore, it can be determined whether the adjacent lane 104 is occupied by traffic or whether the adjacent lane 104 is free for driving along.

If the adjacent lane 104 is a lane that is present and free, in the traveling direction of the ego vehicle, an approaching behavior in which the driving speed 101 of the ego vehicle 100 is maintained for as long as possible (for example according to variation 321) may be used. On the other hand, an approaching behavior with a relatively earlier reaction, i.e. with a relatively early reduction of the driving speed 101, may be used (for example according to variation 322). Thus, the convenience for a driver of the ego vehicle 100 can be increased.

Figure 4:
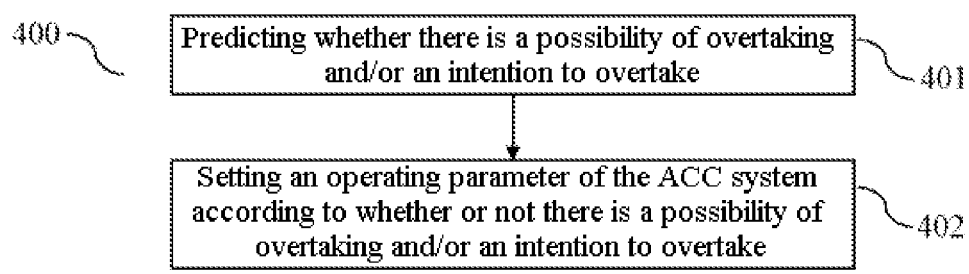
FIG. 4 shows a flow diagram of a method, given by way of example, for operating a cruise controller.

FIG. 4 shows a flow diagram of a method 400, given by way of example, for operating a cruise controller of a vehicle 100. The method 400 may be performed by a control unit 200 of the vehicle 100.

The method 400 comprises predicting 401 during an approaching procedure of the cruise controller of the vehicle 100 with respect to a vehicle in front 110 whether the vehicle 100 will or will not overtake (or can or cannot overtake) the vehicle in front 110 during the approaching procedure. An approaching procedure may in this case be defined in such a way that, during the approaching procedure, the vehicle 100 has already detected the vehicle in front 110; and
an automated activation of the one or more longitudinal guidance actuators 202 of the vehicle 100 takes place in order to position the vehicle 100 at a desired distance 302 from the vehicle in front 100.

During the approaching procedure, the actual distance 102 of the vehicle 100 is typically greater than the desired distance 302. Furthermore, the speed 101 of the vehicle 100 is greater than the speed 111 of the vehicle in front 110.

On the basis of the environment data, the map data and/or the driver data, it can be predicted whether or not the vehicle 100 will overtake the vehicle in front 110 during the approaching procedure. In particular, it can be predicted or determined whether or not the vehicle 100 can overtake the vehicle in front 110 during the approaching procedure.

Furthermore, the method 400 comprises setting 402 the behavior of the cruise controller of the vehicle 100 during the approaching procedure, according to whether it has been predicted that the vehicle 100 will overtake the vehicle in front 110 during the approaching procedure, or that the vehicle 100 will not overtake the vehicle in front 110 during the approaching procedure. In particular, the behavior of the cruise controller of the vehicle 100 during the approaching procedure can be set according to whether it has been predicted or determined that the vehicle 100 can overtake the vehicle in front 110 during the approaching procedure, or that the vehicle 100 cannot overtake the vehicle in front 110 during the approaching procedure. Thus, the convenience for a driver of the vehicle 100 can be increased.

The present invention is not restricted to the exemplary embodiments shown. In particular, it should be noted that the description and the figures are only intended to illustrate the principle of the proposed methods, devices and systems.

What is claimed is:

1. A control unit for a vehicle, wherein the control unit is configured to:
   determine, during an approaching procedure of a cruise controller of the vehicle with respect to a vehicle in front, at least one of:
   whether the vehicle will overtake the vehicle in front during the approaching procedure, or
   whether the vehicle is able to overtake the vehicle in front during the approaching procedure;

set a behavior of the cruise controller of the vehicle during the approaching procedure according to the determination; and adapt a driving speed of the vehicle during the approaching procedure repeatedly according to a value of an error measure; wherein:

the error measure is dependent on a weighted sum of a deviation of an actual distance of the vehicle from the vehicle in front in relation to a desired distance and from an actual relative speed of the vehicle in relation to the vehicle in front; and a weighting in the weighted sum is dependent on whether it has been determined that the vehicle at least one of will overtake or be able to overtake the vehicle in front during the approaching procedure, or that the vehicle at least one of will not overtake or is unable to overtake the vehicle in front during the approaching procedure.

2. The control unit according to claim 1, wherein the control unit is further configured to perform at least one of:
reduce a driving speed of the vehicle during the approaching procedure, at least one of relatively late or with a relatively great deceleration, if it has been determined that the vehicle at least one of will overtake or is able to overtake the vehicle in front during the approaching procedure; or
reduce the driving speed of the vehicle during the approaching procedure, at least one of relatively early or with a relatively small deceleration, if it has been determined that the vehicle at least one of will not overtake or is unable to overtake the vehicle in front during the approaching procedure.

3. The control unit according to claim 1, wherein the control unit is further configured to at least one of:
at least one of delay a point in time of reducing a driving speed of the vehicle during the approaching procedure in comparison with a reference point in time or reduce the driving speed of the vehicle with an increased deceleration in comparison with a reference deceleration if it has been determined that the vehicle at least one of will overtake or be able to overtake the vehicle in front during the approaching procedure; or
at least one of bring forward the point in time of reducing the driving speed of the vehicle during the approaching procedure in comparison with the reference point in time or reduce the driving speed of the vehicle with a reduced deceleration in comparison with the reference deceleration if it has been determined that the vehicle at least one of will not overtake or is unable to overtake the vehicle in front during the approaching procedure.

4. The control unit according to claim 1, wherein at least one of:
the weighting with respect to the actual relative speed of the vehicle is at least one of set relatively high or is increased in comparison with the weighting with respect to the deviation of the actual distance from the desired distance if it has been determined that the vehicle at least one of will not overtake or is unable to overtake the vehicle in front during the approaching procedure; or
the weighting with respect to the actual relative speed of the vehicle is at least one of set relatively low or is reduced in comparison with the weighting with respect to the deviation of the actual distance from the desired distance if it has been determined that the vehicle at least one of will overtake or can overtake the vehicle in front during the approaching procedure.

5. The control unit according to claim 1, wherein the control unit is further configured to:
predict, during the approaching procedure of the cruise controller of the vehicle with respect to the vehicle in front, whether or not the vehicle is able to overtake the vehicle in front during the approaching procedure; and
set a behavior of the cruise controller of the vehicle during the approaching procedure according to the prediction.

6. The control unit according to claim 1, wherein the control unit is further configured to at least one of:
ascertain environment data from one or more environment sensors of the vehicle;
determine on the basis of the environment data whether the vehicle will overtake the vehicle in front during the approaching procedure; or determine on the basis of the environment data whether the vehicle is able to overtake the vehicle in front during the approaching procedure.

7. The control unit according to claim 1, wherein the control unit is further configured to:
ascertain map data with respect to a roadway on which the vehicle is driving; and at least one of:
determine on the basis of the map data whether the vehicle will overtake the vehicle in front during the approaching procedure; or
determine on the basis of the map data whether the vehicle is able to overtake the vehicle in front during the approaching procedure.

8. The control unit according to claim 1, wherein the control unit is further configured to:
ascertain driver data with respect to a driver of the vehicle; and
determine on the basis of the driver data whether the vehicle will overtake the vehicle in front during the approaching procedure.

9. The control unit according to claim 8, wherein the driver data relates to a behaviour of the driver.

10. The control unit according to claim 1, wherein the control unit is configured to operate the vehicle during operation of the cruise controller such that, after completion of the approaching procedure, the vehicle at least one of:
is at least on average over time at a desired distance from the vehicle in front; or has at least on average over time a driving speed of the vehicle in front.

11. A method for operating a cruise controller of a vehicle, the method comprising:
determining, during an approaching procedure of the cruise controller of the vehicle with respect to a vehicle in front, at least one of whether the vehicle will overtake the vehicle in front during the approaching procedure or whether the vehicle is able to overtake the vehicle in front during the approaching procedure;
setting a behavior of the cruise controller of the vehicle during the approaching procedure according to whether it has been determined that the vehicle at least one of will overtake or is able to overtake the vehicle in front during the approaching procedure, or it has been determined that the vehicle at least one of will not overtake or is unable to overtake the vehicle in front during the approaching procedure; and
adapting a driving speed of the vehicle during the approaching procedure repeatedly according to a value of an error measure; wherein:
the error measure is dependent on a weighted sum of a deviation of an actual distance of the vehicle from the vehicle in front in relation to a desired distance and from an actual relative speed of the vehicle in relation to the vehicle in front; and a weighting in the weighted sum is dependent on whether it has been determined that the vehicle at least one of will overtake or be able to overtake the vehicle in front during the approaching procedure, or that the vehicle at least one of will not overtake or is unable to overtake the vehicle in front during the approaching procedure.

* * * * *